2,932,648

NICOTINAMIDE PROCESS

Morris Freifelder and Irvin W. Sangrelet, Waukegan, Ill., assignors to Abbott Laboratories, Chicago, Ill., a corporation of Illinois No Drawing. Application October 6, 1958
Serial No. 765,333

3 Claims. (Cl. 260—295.5)

This invention relates to a novel process for preparing nicotinamide. In particular, it relates to a process for aminating the tetrahydrofurfuryl ester of nicotinic acid.

The amide of nicotinic acid is a valuable product widely used in many pharmaceutical preparations. Because of its value, many efforts of the prior art are directed to its production. One of the most frequently used and preferred methods is ammonolysis of an aliphatic alcohol ester of nicotinic acid. This procedure consists of mixing aqueous or anhydrous ammonia with the ester and allowing the mixture to stand until ammonolysis is complete. The ammonolysis of such nicotinic acid esters is characterized by the serious disadvantage that extended periods of time are required for complete reaction and conversion to nicotinamide in good yield. It is known that ammonolysis of higher alcohol esters of nicotinic acid requires more than two days. In the practice of such a process, the ester is mixed with aqueous ammonia or anhydrous ammonia in a vat and the resulting mixture is allowed to stand for several days until conversion to the amide is substantially completed. Another disadvantage associated with ammonolysis of higher alcohol esters of nicotinic acid is the necessity of using a solvent, such as methanol, to dissolve the ester.

The conversion of nicotinic esters to nicotinamide requires a shorter time with lower alcohol esters of nicotinic acid such as methyl or ethyl nicotinate, but there is an economic disadvantage in producing such esters because the process involves large amounts of acid catalysts. It is desirable to employ higher alcohol esters of nicotinic acid because said ester formation can be performed with far lesser amounts of catalyst or even without a catalyst (see U.S. 2,816,112). However, such higher alcohol esters of nicotinic acid require a prolonged period for conversion to nicotinamide as described hereinbefore.

It is an object of this invention to provide a method for preparing nicotinamide by a simple process.

Another object of this invention is to provide a method for preparing nicotinamide in short reaction periods utilizing an inexpensive and readily available source of nicotinic acid ester.

To obtain the foregoing objects and other objects which will be apparent, it is now provided in accordance with the teachings of this invention that the tetrahydrofurfuryl ester of nicotinic acid is converted to the amide within a period of four hours.

In the practice of this invention, tetrahydrofurfuryl nicotinate is preferably mixed with a stoichiometric excess of aqueous ammonia or anhydrous ammonia at or about room temperature. The mixture is allowed to stand at room temperature for a few hours, after which the liberated tetrahydrofurfuryl alcohol and water (from aqueous ammonia) is separated by distillation. The amide product is collected by filtration or other conventional means and dried. Since the tetrahydrofurfuryl ester of nicotinic acid dissolves in the aqueous medium, it is not necessary to use an added solvent. The elimination of this step results in an additional advantage of the process.

It is surprising and unexpected to find that the tetrahydrofurfuryl ester of nicotinic acid can be converted to nicotinamide within a very short period of time. Although the convenient and preferred method of amide conversion occurs at or about room temperature, it will be apparent that higher temperatures, with or without high pressure conditions, may also be employed to utilize the advantages of the disclosed method. The process becomes more important and economical because the starting ester can be obtained in large amounts without great expense. It is thus apparent that the improvements resulting from the process arise from employing tetrahydrofurfuryl nicotinate as a reactant.

The tetrahydrofurfuryl alcohol ester of nicotinic acid may be obtained by known methods, among which is the method described in U.S. 2,485,152. A simpler and more economical method provides refluxing nicotinic acid and tetrahydrofurfuryl alcohol in the presence of an inert organic solvent such as benzene. This reaction can be conducted with or without an acid catalyst. By conducting the foregoing reaction through a fractionating column equipped with a water separator, quantitative amounts of the ester may be obtained by simple process steps.

The following examples are presented to teach the method in operation, but it should be understood that said examples are not intended to limit the invention in any way.

*Example I*

Into a reaction vessel is placed 150 gms. (0.75 mole) of tetrahydrofurfuryl nicotinate, and 200 cc. (3.5 mole) of aqueous ammonia is added portionwise thereto. The mixture is stirred occasionally, and the reaction is allowed to continue at room temperature. The ester dissolves in the aqueous ammonia and is converted to the amide within three hours. The mixture is then passed through a cation exchange resin (IRA 400) to remove any unreacted materials or impurities. Benzene is added to the collected effluent, and the nicotinamide precipitates from solution. Upon evaporation of the solvent, nicotinamide is obtained in a yield of 91% as a white crystalline solid, M.P. 128°–130° C.

*Example II*

According to the method set out in Example I, nicotinamide is produced within four hours by aminating various amounts of tetrahydrofurfuryl nicotinate (THF ester) with aqueous ammonia. The following table sets out a series of runs wherein the amount of reactants, the weight of the collected amide and the percent yield of nicotinamide are presented:

| Run No. | THF Ester | | Aqueous Ammonia | | Amide Yield, Grams | Percent Yield of Amide |
|---|---|---|---|---|---|---|
| | Grams | Moles | Ml. | Moles | | |
| 1 | 20.0 | 0.10 | 20.0 | 0.35 | 9.0 | 85 |
| 2 | 50.0 | 0.25 | 100.0 | 1.75 | 20.2 | 69 |
| 3 | 50.0 | 0.25 | 100.0 | 1.75 | 20.0 | 68 |
| 4 | 150.0 | 0.75 | 200.0 | 3.50 | 67.0 | 76 |
| 5 | 186.0 | 0.93 | 200.0 | 3.50 | 88.0 | 80 |
| 6 | 173.0 | 0.86 | 200.0 | 3.50 | 86.0 | 86 |

The nicotinamide is formed by reacting the tetrahydrofurfuryl ester of nicotinic acid with ammonia, but it is a preferred practice to employ an excess over the stoichiometric amount of ammonia to tetrahydrofurfuryl nicotinate to obtain optimum results. The reaction is conducted simply by stirring the mixture, whereupon the ester dissolves in the aqueous medium without requiring the presence of an added solvent. Separation of the formed nicotinamide is by simple and conventional physical steps.

Others may practice the invention in any of the numerous ways which will be suggested by this disclosure to one skilled in the art. All such practice of the invention is considered to be a part hereof provided it falls within the scope of the appended claims.

We claim:

1. In the method for preparing nicotinamide by the ammonolysis of an alcohol ester of nicotinic acid, the improvement which comprises reacting tetrahydrofurfuryl nicotinate with at least a stoichiometric amount of ammonia, without the presence of a catalyst, and substantially completing said reaction within four hours.

2. In the method for preparing nicotinamide by the ammonolysis of an alcohol ester of nicotinic acid, the improvement which comprises reacting tetrahydrofurfuryl nicotinate with excess ammonia, without the presence of a catalyst, for about three hours, and collecting the formed nicotinamide.

3. The improved process of claim 2 whereby one mole of tetrahydrofurfuryl nicotinate is reacted with about four moles of ammonia at room temperature.

References Cited in the file of this patent

UNITED STATES PATENTS

| | | |
|---|---|---|
| 2,510,922 | Berg et al. | June 6, 1950 |
| 2,752,355 | Lustig | June 26, 1956 |